(12) United States Patent
Kiikka

(10) Patent No.: US 6,901,845 B2
(45) Date of Patent: Jun. 7, 2005

(54) POROUS RESTRICTOR FOR GAS BEARING

(75) Inventor: Dale E. Kiikka, Athens, OH (US)

(73) Assignee: Global Cooling BV, Zutphen (NL)

( * ) Notice: Subject to any disclaimer, the term of this patent is extended or adjusted under 35 U.S.C. 154(b) by 30 days.

(21) Appl. No.: 10/476,769

(22) PCT Filed: Oct. 18, 2002

(86) PCT No.: PCT/US02/33291
§ 371 (c)(1),
(2), (4) Date: Nov. 5, 2003

(87) PCT Pub. No.: WO03/036071
PCT Pub. Date: May 1, 2003

(65) Prior Publication Data
US 2004/0154468 A1 Aug. 12, 2004

Related U.S. Application Data
(60) Provisional application No. 60/345,472, filed on Oct. 19, 2001.

(51) Int. Cl.[7] .............................................. F01B 31/10
(52) U.S. Cl. ................................. 92/153; 60/520; 384/7
(58) Field of Search ............................. 60/520; 92/153; 384/7, 8, 9, 10, 11, 12

(56) References Cited

U.S. PATENT DOCUMENTS

| 2,907,304 A | | 10/1959 | Macks | |
|---|---|---|---|---|
| 3,001,609 A | | 9/1961 | Macks | |
| 3,777,722 A | * | 12/1973 | Lenger | .................... 92/153 |
| 4,749,283 A | | 6/1988 | Yokomatsu et al. | |
| 4,759,265 A | | 7/1988 | Stoll et al. | |

* cited by examiner

Primary Examiner—Thomas E. Lazo
(74) Attorney, Agent, or Firm—Frank H. Foster; Kremblas, Foster, Phillips & Pollick

(57) ABSTRACT

A gas restrictor particularly usrful for applicatio in gas bearing as used, for example, in free-piston Striling cycle machinery. Porous strip material together with a backing plate and orifice (bleed hole) is used to provide the restriction to the flow of gas into an annular gap between a piston and a cylinder.

24 Claims, 4 Drawing Sheets

POROUS RESTRICTOR FOR GAS BEARING

This application claims the benefit of provisional 60/345,472, filed on Oct. 19, 2001.

BACKGROUND OF THE INVENTION

1. Field Of The Invention

This invention relates generally to gas bearings as used, for example, in free-piston Stirling machines, and relates more particularly to a restrictor apparatus used with gas bearings.

2. Description of the Related Art

In many different machines, pistons reciprocate in a cylinder formed in a housing. Due to accurate machining, a thin annular gap is formed between the cylinder wall and the piston wall. In Stirling cycle machines, for example, the housing encloses a work space bounded by one end of the piston and a back space bounded by the opposite end of the piston. The term "piston" can refer generically to any piston-like body, including the displacer in a Stirling cycle machine. A working gas, such as helium, fills the workspace, back space and other regions of the machine within the housing.

Because of the close proximity of the piston and cylinder walls during operation, the annular gap formed between the walls must be lubricated to prevent rapid wear. The most effective lubrication has been found to be a thin layer of the working gas forming a gas bearing. Such gas bearings are described in U.S. Pat. Nos. 4,412,418, 4,802,332 and 4,888,950, all to Beale, which are incorporated by reference.

In order to lubricate the moving piston, gas must be directed into the gap at three or more points around the peripheral surface of the piston after being routed from the workspace or back space. Transporting the gas into the annular gap often requires a network of small passages. The passages that route the working gas directly into the annular gap are often extremely small to restrict the flow of gas. Restricting the flow of gas is necessary to maintain a constant gas pressure, but very small passages and other structures that restrict the flow of gas into a clearance gap, commonly referred to as "restrictors", are especially susceptible to blockage.

Conventionally, gas bearing restrictors have been provided by a number of means: capillary tubes, screws and close fitting parts with accurate passages used to direct the gas into the clearance gap. All of these previous techniques and structures suffer from cost or sensitivity to blockage by small particles in the working gas. A desirable restrictor would have low cost, temperature and creep stability and little or no susceptibility to blockage.

BRIEF SUMMARY OF THE INVENTION

The invention is a porous body, preferably a porous plastic strip covering the upstream side of an orifice leading into the clearance gap. In a preferred embodiment, the plastic strip is supported by a backing ring that biases outwardly to keep the strip in place. The diameter of the orifice, the porosity of the plastic strip and the width and the degree of compression of the backing ring control the degree of restriction imposed to the gas flow. The downstream side of the orifice is directly adjacent to its associated gas bearing cavity in the clearance gap.

The space upstream of the gas bearing restrictor is the charge volume. In a preferred embodiment, the charge volume is pressurized to the maximum pressure in the Stirling cycle by the use of a small reed check valve. The charge volume bleeds through the restrictive porous strip and via the orifice to the gas bearing clearance gap and then through the clearance gap. By arranging the restrictors to have a similar restriction to the resistance of the clearance gap, it is possible to obtain close to maximum gas bearing stiffness.

When the component with the gas bearing, the piston in one embodiment, moves eccentrically, one or more cavities are moved closer to the cylinder wall. This restricts the flow of gas locally through the clearance gap even more, which tends to increase the local pressure in the clearance gap. The cavity or cavities on the opposite side of the piston become less restricted and therefore bleed down and lose pressure. This causes a net force on the piston tending to move the piston away from the cylinder wall, and maintains a gas film for lubrication.

The use of the plastic porous strip as a restrictor has the advantage of being multi-pathed and therefore far less likely to become blocked with loose particles. There are distributed orifices for the gas to flow through, and if one becomes blocked, it will have little effect on the gas bearing. A further advantage is that the gas bearing restrictor becomes its own filter which prevents small particles from entering the close fitting clearance seals typically found on machines that employ gas bearings.

The porous material is easily fitted into a piston sleeve by providing a backing ring or spring that squeezes the porous material against the orifices of the gas bearing. Installation could be done by an automatic machine and appears to be advantageous for high volume production.

Costs in material and labor appear to be extremely low compared to conventional techniques. Reliability is expected to be far better due to lower likelihood of blockage and prevention of particles coming into the clearance gap. This gas bearing restrictor appears particularly favorable for implementation in Stirling cycle machinery.

The proposed invention appears to offer all these advantages and has the additional advantage of providing a filter for particles that might damage or wear the close fitting bearing surfaces. Restriction performance has been found to be comparable to precision restrictors consisting of 60-micron glass capillaries of 5-mm length.

Figure 1:
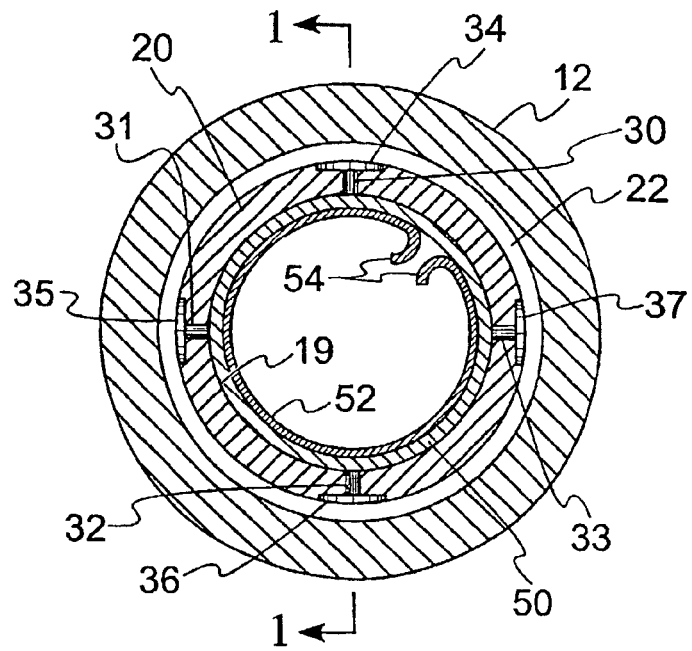
FIG. 1 is a side view in section illustrating a preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 4:
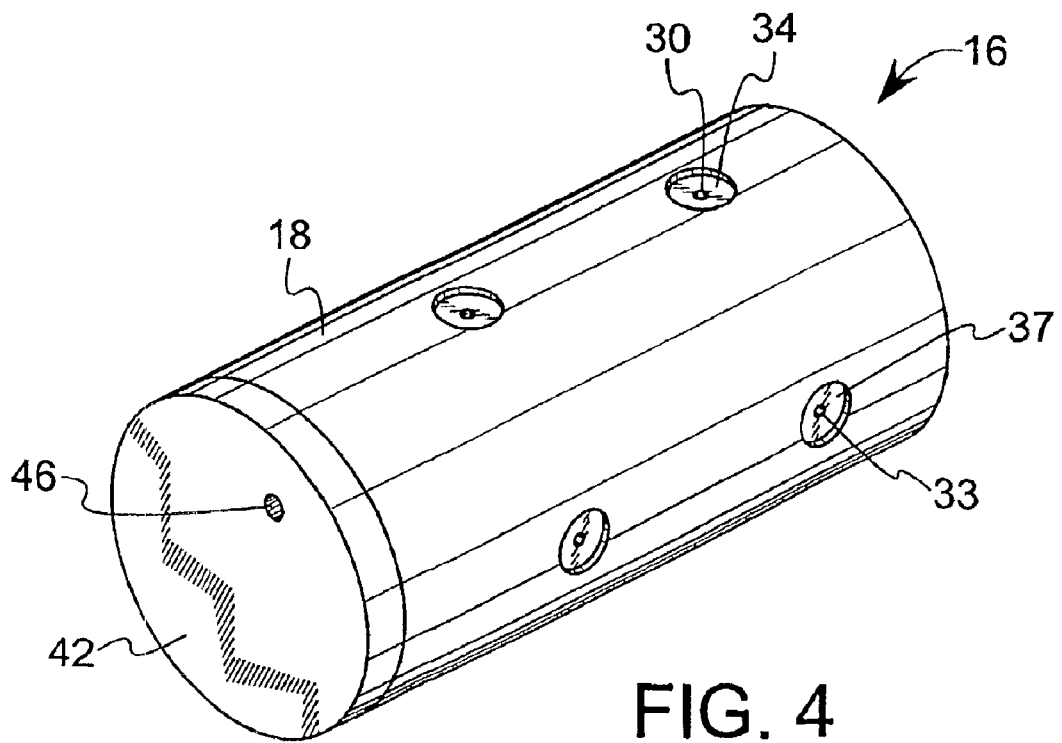
FIG. 4 is a view in perspective illustrating a preferred piston.

The preferred embodiment of the present invention is shown in FIG. 1, in which the free piston Stirling cycle apparatus 10 includes a cylindrical housing 12 having an internal sidewall surface 14, which is a circular cylinder. The piston 16, also shown in FIG. 4, has an outer cylindrical surface 18 on the sidewall 20 that is disposed in close proximity to the internal cylindrical surface 14 of the housing sidewall 12.

There is an annular gap 22 formed between the piston 16 and the housing 12 in which the working fluid, such as helium gas, flows. The size of the annular gap is, exaggerated in the drawings. The diametrical difference of the outer surface of the piston 16 and the housing inner surface 14 is between about 15 and 35 microns in a contemplated embodiment. Thus, the annular gap is half of that difference when the piston 16 is radial dead center (eccentricity of zero), which is 7.5 to 17.5 microns. The gas flows through the annular gap 22, thereby providing a fluid bearing as is known conventionally.

The gas supplied to the annular gap 22 comes out of the charge cavity 40, which is the chamber within the piston 16 that is sealed off with the piston cap 42. Gas is supplied to the charge cavity 40, in the preferred embodiment, from an alternating pressure source through a reed valve consisting of the reed 44, the orifice 46 and the holding screw 48. The purpose of the reed valve is to prevent gas from leaving the charge cavity 40 other than into the gap 22, and to allow gas into the charge cavity 40 only when the gas pressure in, for example, the compression space 41, is higher than that in the charge cavity 40. The ideal maximum pressure in the charge cavity 40 is the peak pressure subjected to the piston cap 42. This pressure variation is usually generated by the motion of the piston 16 as is known in the Stirling cycle machinery art. A check valve filter (not shown) can be added to protect the ability of the reed valve to seat properly by keeping debris from contaminating the sealing components thereof.

Orifices 30, 31, 32 and 33 are formed in the sidewall 20 near one end of the piston 16 at four equally spaced intervals around the piston 16. Another set of four similar orifices is formed close to the opposite end of the piston 16 as shown. These orifices convey gas in the charge cavity 40 into the annular gap 22. The orifices formed on the piston 16 preferably do not restrict the flow of gas therethrough, and are approximately 1.0 millimeter in diameter in the preferred embodiment. Of course, more or fewer than four orifices can be formed near each end of the piston 16, and the sizes, relative positions, shapes and angles of orientation can be varied according to principles understood by those having ordinary skill in the gas bearing technology.

In a preferred embodiment, ports 34, 35, 36 and 37 are formed on the outer cylindrical surface 18 of the piston 16 at the ends of the orifices 30–33, as is conventional. Similar ports are formed at the ends of the orifices near the opposite end of the piston 16, so that there are two sets of four gas bearings near each end of the piston 16.

A fluid-permeable, porous body, preferably the gas-permeable, porous plastic strip 50, is mounted against the inner surface 19 of the piston 16. A similar strip 60 is similarly mounted near the opposite of the piston 16. The strip is described as porous, which means that it contains many extremely small passages extending entirely through the strip. These passages function as capillary passages that restrict or meter the flow of fluid therethrough. The strip has a thickness significantly smaller than its width and its length. One material contemplated for use as the strips 50 and 60 is sold under the name POREX T3 Bacteria Sheet #7744 having a pore size in the range of 7 to 150 microns with void volumes of 35–50%. The product has a thickness of 0.025 inches and is made of polyethylene, although it is contemplated that polypropylene could work.

Mounting means, preferably backing springs 52 and 62, bias outwardly against the strips 50 and 60, respectively, to force the outer surfaces of the strips against the inner surface 19. The flow of gas is illustrated by the arrows in FIG. 1 extending along a fluid flow path extending from the charge cavity 40, through the strips 50 and 60, the orifices 30–33, the ports 34–37 and into the annular gap 22.

Figure 2:
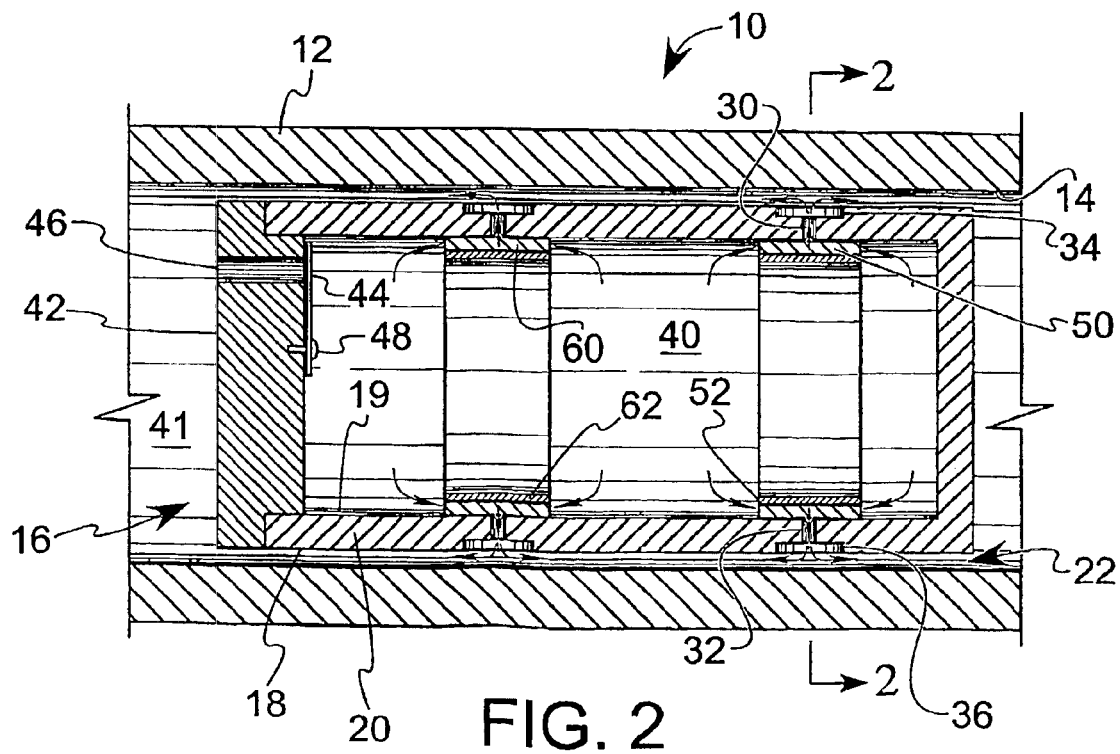
FIG. 2 is an end view in section through the line 2—2 of FIG. 1.
Figure 3:
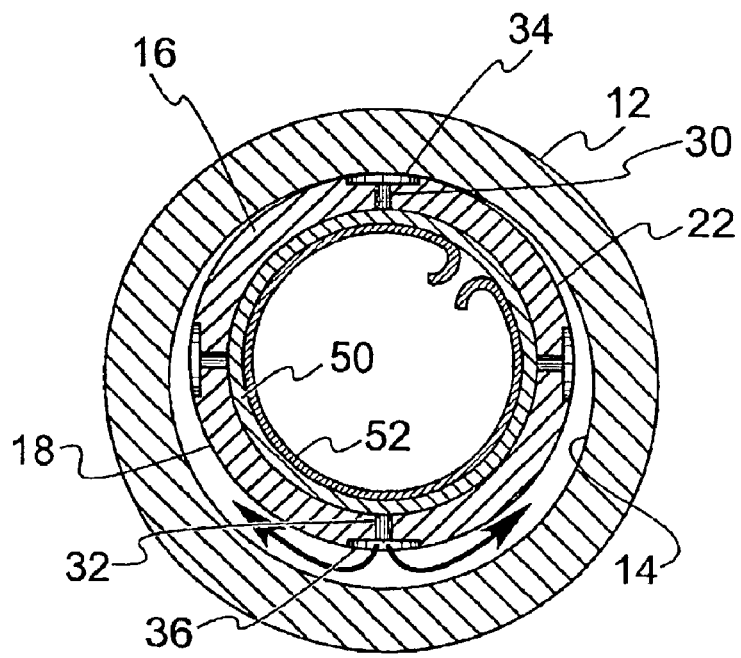
FIG. 3 is an end view in section similar to that of FIG. 2, and illustrating the piston at a position away from radial dead center.

Referring to FIG. 2, the strip 50 is mounted, with the aid of the backing spring 52, against the piston sidewall 20. The strip 50 and compression spring 52 are arranged to seat on the radially inwardly facing surface 19 of the piston 16, and are positioned upstream of the orifices 30–33. The term "upstream" has its usual meaning and therefore a first object in a gas stream will be contacted by gas molecules before a second object if the first object is upstream of the second. Tabs 54 allow convenient compression of the spring 50 to aid in rapid assembly and disassembly.

The present invention operates in the following manner with reference to FIGS. 1, 2, 3 and 4. When the piston 16 begins to veer away from radial dead center, one of its sides approaches the cylinder housing wall 14. This is illustrated, again in exaggerated relative dimensions, in FIG. 3 in which the piston's surface 18 comes closer to the wall 14 near the orifice 30 and the port 34. The gas bearing passages tend to close off on the side where the piston 16 is closest to the cylinder wall 14, and the passages tend to open on the side where the piston 16 is farthest from the cylinder wall 14, which is at the opposite side. The orifice 30 and port 34 are unable to bleed off as much gas due to the restriction caused by the piston and cylinder coming closer together, and therefore tend to increase the local pressure in the annular gap 22 from the gas bleeding in through the restrictive porous strip 50. The orifice 32 and port 36 on the opposite side are not as closed off so they tend to bleed down and lose pressure. The pressure difference causes a net force that opposes the piston 16 motion towards the cylinder wall 14, thus avoiding contact between the piston 16 and cylinder wall 14 and tending to push the piston back to radial dead center.

For optimum stiffness (defined as righting force per unit radial displacement) of the gas bearings, the designed restriction of the combination of each orifice 30–33 and the strip 50 is approximately the same as the leakage restriction caused by the annular clearance gap 22. The same relationship exists at the strip 60 and its associated orifices. Because the orifices 30–33 are essentially free flowing in the preferred embodiment, the restriction of the combination is made up essentially entirely of the restriction to flow of the fluid through the strip 50. Of course, a different compromise could be established between a more restrictive orifice than in the preferred embodiment, and a less restrictive porous strip than in the preferred embodiment.

The dimensions of the ports 34–37 are chosen to maintain stability to the radial motion of the piston 16 within its cylinder 12. This means that when the piston 16 is displaced radially, its righting motion is such that no radial oscillations are induced that would allow the piston 16 to eventually collide with the cylinder 12.

Figure 5:
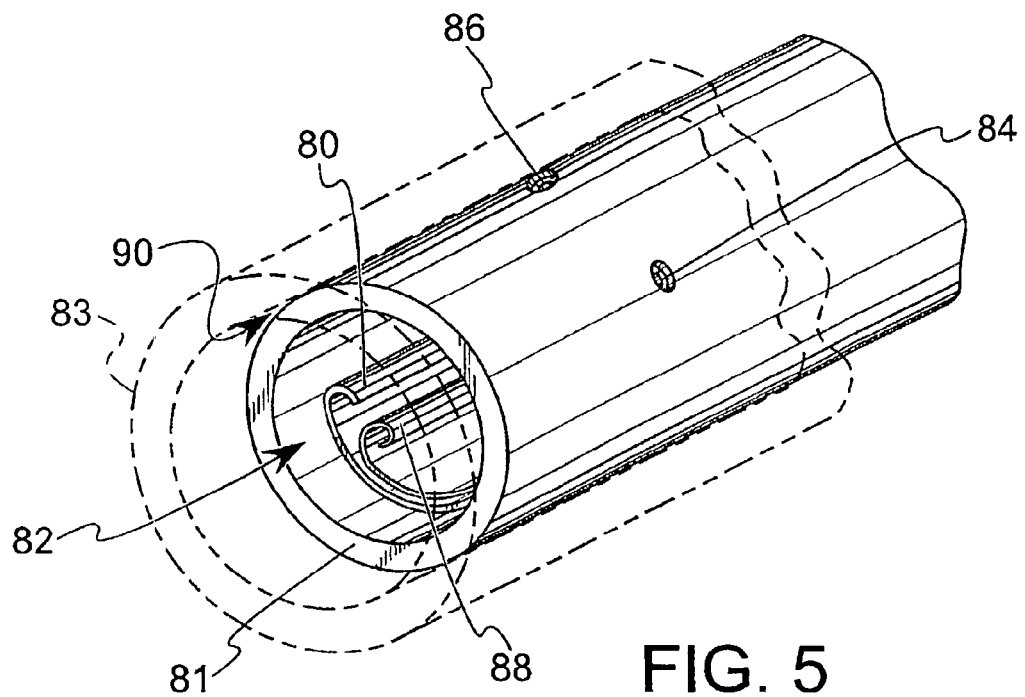
FIG. 5 is a schematic view in section illustrating an alternative porous sheet and its attachment to the piston.

An alternative embodiment is shown in FIG. 5, in which a porous body, such as the sheet 80, is bonded directly to the upstream, inner surface 82 of the piston sidewall 81, thereby covering the orifices 84, 86 and others not shown. This can be accomplished by the use of adhesive, for example. The porous sheet 80 is then backed with a non-porous film or sheet 88, such as aluminum tape, for example. Compression of the porous sheet is minimal since sealing is provided by the adhesive film. Fluid may only flow through the orifices by first passing through the porous sheet 80, and fluid can only enter the porous sheet 80 from the edges of the porous sheet 80 that are not sealed by the non-porous sheet 88.

In this embodiment, the restriction to the flow of fluid is a function of the orifices' diameters and the porosity and width of the porous sheet. As in the preferred embodiment, the restriction is designed to have a similar restriction to the resistance to the fluid flow in the annular gap 90 between the piston 81 and the cylinder housing 83 after the gas-bearing orifice. Such a design provides maximum gas bearing stiffness.

Figure 6:
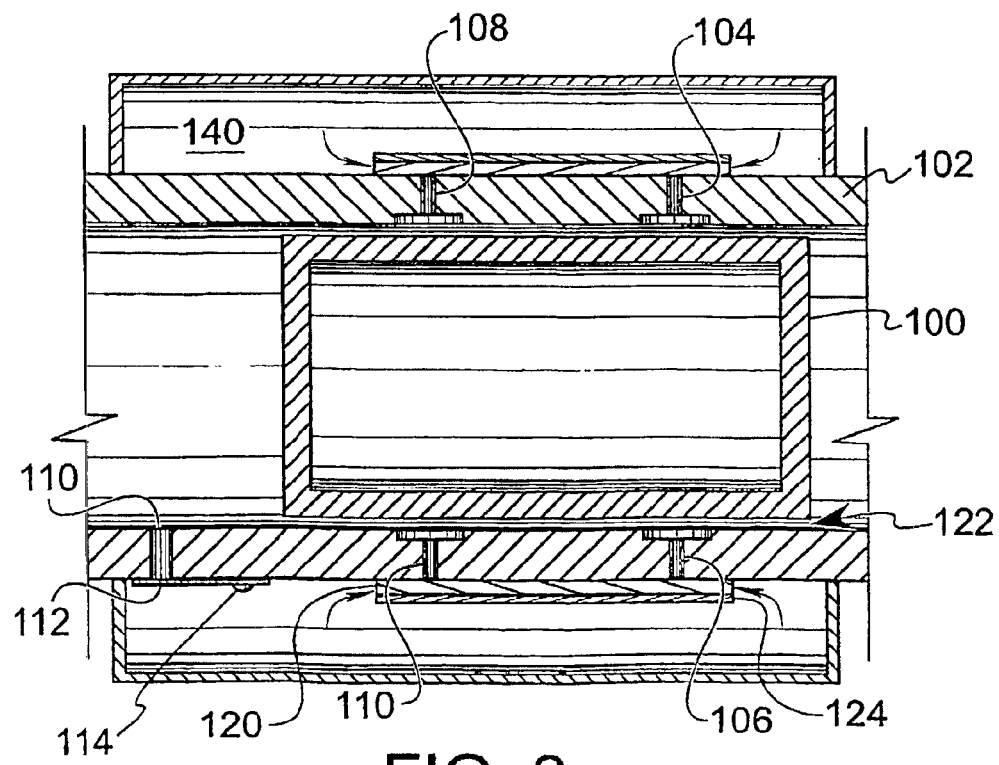
FIG. 6 is a schematic side view in section illustrating an alternative embodiment of the present invention.
Figure 7:
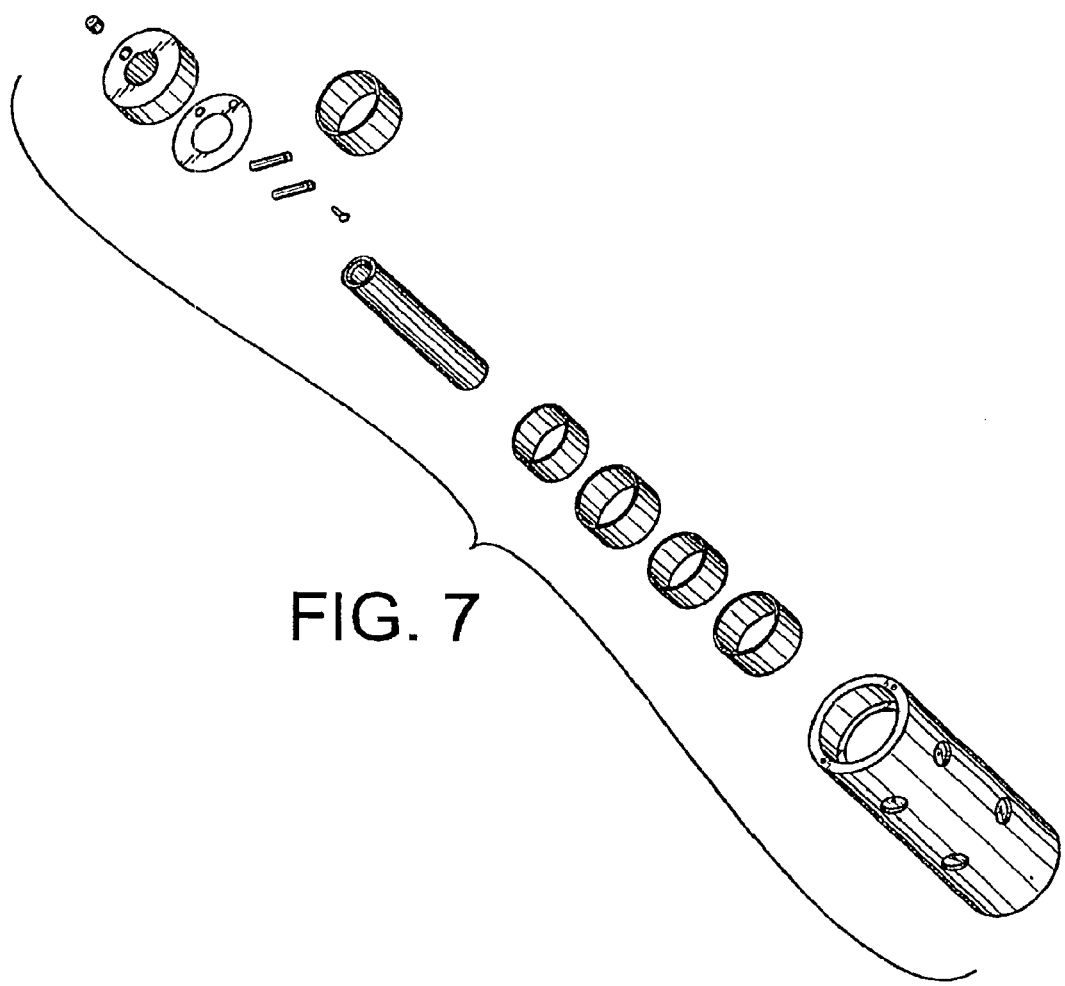
FIG. 7 is an exploded view illustrating a piston assembly with gas bearings and restrictors according to this invention. The porous restrictor material is in the form of a ring and the backing is facilitated by a compression ring that forces the porous ring against the orifices. Two sets of gas bearings are shown (four gas bearings for each set). Also shown in this view is the reed check valve for pressurizing the charge cavity.

Another alternative embodiment of the present invention is shown in FIG. 6, in which a piston 100 is slidably mounted within the cylindrical housing sidewall 102. Rather than the orifices being formed in the piston sidewall as described above, in the embodiment of FIG. 6 the orifices are formed in the cylindrical housing sidewall 102. Orifices 104, 106, 108 and 110 extend entirely through the sidewall 102 from the charge cavity 140. The charge cavity 140 extends around the periphery of the sidewall 102 and is in fluid communication with the annular gap 122 between the piston 100 and sidewall 102.

The charge cavity 140 is charged by gas entering through the passageway 110 past the reed 112, which is held in place by the screw 114. Fluid flows from the charge cavity 140 through the porous body, such as the porous strip 120 through the orifices 104, 106, 108 and 110 and into the annular clearance gap 122. The backing spring 124 produces a radially inwardly directed bias to hold the strip 120 in place over the orifices 104–110. The fluid, such as helium gas, in the charge cavity 140 therefore must flow through the edges of the strip 120 as shown by the arrows in FIG. 6 to reach the orifices 104–110. The illustration of FIG. 6 shows that it is possible to vary the positioning of the orifices, the porous strips, the charge cavity and other structures and yet stay within the bounds of the instant invention.

While certain preferred embodiments of the present invention have been disclosed in detail, it is to be understood that various modifications may be adopted without departing from the spirit of the invention or scope of the following claims.

What is claimed is:

1. A fluid bearing apparatus in a machine having a piston with a sidewall having an outer cylindrical surface disposed in close proximity to an inner cylindrical surface of a housing sidewall in which the piston is slidably mounted, and an annular clearance gap between the cylindrical surface of the piston and the cylindrical surface of the housing, the fluid bearing apparatus comprising:

a) a fluid flow path extending in a stream from a plurality of orifices formed through at least one of said sidewalls into the annular gap; and b) a fluid-permeable, porous body mounted in the fluid flow path upstream of at least one of said orifices.

2. The fluid bearing apparatus in accordance with claim 1, wherein the piston sidewall has an internal chamber, defined by an inner surface in the piston sidewall, the fluid flow path stream extends from the internal chamber through the plurality of orifices formed through the piston sidewall and into the annular gap, and the porous body is mounted in the fluid flow path to the inner surface of the piston sidewall upstream of said orifices.

3. The fluid bearing apparatus in accordance with claim 2, further comprising means for mounting said porous body to the inner surface of the piston sidewall.

4. The fluid bearing apparatus in accordance with claim 2, wherein the porous body further comprises a strip having a strip length and strip width significantly greater than a strip thickness, and said strip extends substantially entirely around the internal chamber, seating against the inner surface of the piston sidewall.

5. The fluid bearing apparatus in accordance with claim 4, further comprising a bias seating against the strip and applying a radially outwardly directed force against the strip for maintaining the strip mounted to the inner surface of the piston sidewall.

6. The fluid bearing apparatus in accordance with claim 4, further comprising a fluid-impermeable film seating against one side of the strip, interposing the strip between the film and the inner surface of the piston sidewall for forcing fluid to flow through an edge of the strip upstream of one of the orifices.

7. The fluid bearing apparatus in accordance with claim 1, wherein the housing sidewall has an outer surface, the fluid flow path extends in a stream from the outer surface of the housing sidewall through the plurality of orifices formed through the housing sidewall and into the annular gap, and the porous body is mounted in the fluid flow path to the outer surface of the housing sidewall upstream of said orifices.

8. The fluid bearing apparatus in accordance with claim 7, further comprising means for mounting said porous body to the outer surface of the housing sidewall.

9. The fluid bearing apparatus in accordance with claim 7, wherein the porous body further comprises a strip having a strip length and strip width significantly greater than a strip thickness, and said strip extends substantially entirely around, and seats against, the outer surface of the housing sidewall.

10. The fluid bearing apparatus in accordance with claim 9, further comprising a bias seating against the strip and applying a radially inwardly directed force against the strip for maintaining the strip mounted to the outer surface of the housing sidewall.

11. The fluid bearing apparatus in accordance with claim 9, further comprising a fluid-impermeable film seating against one side of the strip, interposing the strip between the film and the outer surface of the housing sidewall for forcing fluid to flow through an edge of the strip upstream of one of the orifices.

12. The fluid bearing apparatus in accordance with claim 1, wherein the resistance to the flow of fluid through each combination of the porous body and one of the orifices substantially equals the resistance to the flow of fluid through the annular gap.

13. A fluid bearing apparatus in a machine having a piston with a sidewall having an outer cylindrical surface disposed in close proximity to an inner cylindrical surface of a housing sidewall in which the piston is slidably mounted, the piston sidewall having an internal chamber, defined by an inner surface in the piston sidewall, the machine also having an annular clearance gap between the outer cylindrical surface of the piston and the cylindrical surface of the housing, the fluid bearing apparatus comprising:

a) a fluid flow path extending in a stream from the internal chamber through a plurality of orifices formed through the piston sidewall and into the annular gap, and b) a fluid-permeable, porous body mounted in the fluid flow path to the inner surface of the piston sidewall upstream of said orifices.

14. The fluid bearing apparatus in accordance with claim 13, further comprising means for mounting said porous body to the inner surface of the piston sidewall.

15. The fluid bearing apparatus in accordance with claim 13, wherein the porous body further comprises a strip having a strip length and strip width significantly greater than a strip thickness, and said strip extends substantially entirely around the internal chamber, seating against the inner surface of the piston sidewall.

16. The fluid bearing apparatus in accordance with claim 15, further comprising a bias seating against the strip and applying a radially outwardly directed force against the strip for maintaining the strip mounted to the inner surface of the piston sidewall.

17. The fluid bearing apparatus in accordance with claim 15, further comprising a fluid-impermeable film seating against one side of the strip, interposing the strip between the film and the inner surface of the piston sidewall for forcing fluid to flow through an edge of the strip upstream of one of the orifices.

18. The fluid bearing apparatus in accordance with claim 13, wherein the resistance to the flow of fluid through each combination of the porous body and one of the orifices substantially equals the resistance to the flow of fluid through the annular gap.

19. A fluid bearing apparatus in a machine having a piston with a sidewall having an outer cylindrical surface disposed in close proximity to an inner cylindrical surface of a housing sidewall in which the piston is slidably mounted, the housing sidewall having an outer surface, the machine also having an annular clearance gap between the outer cylindrical surface of the piston and the inner cylindrical surface of the housing, the fluid bearing apparatus comprising:

a) a fluid flow path extending in a stream from the outer surface of the housing sidewall through a plurality of orifices formed through the housing sidewall and into the annular gap; and b) a fluid-permeable, porous body mounted in the fluid flow path to the outer surface of the housing sidewall upstream of said orifices.

20. The fluid bearing apparatus in accordance with claim 19, further comprising means for mounting said porous body to the outer surface of the housing sidewall.

21. The fluid bearing apparatus in accordance with claim 19, wherein the porous body further comprises a strip having a strip length and strip width significantly greater than a strip thickness, and said strip extends substantially entirely around, and seats against, the outer surface of the housing sidewall.

22. The fluid bearing apparatus in accordance with claim 21, further comprising a bias seating against the strip and applying a radially inwardly directed force against the strip for maintaining the strip mounted to the outer surface of the housing sidewall.

23. The fluid bearing apparatus in accordance with claim 21, further comprising a fluid-impermeable film seating against one side of the strip, interposing the strip between the film and the outer surface of the housing sidewall for forcing fluid to flow through an edge of the strip upstream of one of the orifices.

24. The fluid bearing apparatus in accordance with claim 19, wherein the resistance to the flow of fluid through each combination of the porous body and one of the orifices substantially equals the resistance to the flow of fluid through the annular gap.

* * * * *